United States Patent [19]

Roccati et al.

[11] 4,383,814

[45] May 17, 1983

[54] APPARATUS FOR THE SIMULTANEOUS CLOSING OF THE TWO OPENINGS OF A PRESS FOR MANUFACTURING WOOD CHIPBOARD OR FIBREBOARD OR THEIR SUBSTITUTES

[75] Inventors: Sergio Roccati; Lino Cecini, both of Monza, Italy

[73] Assignee: F.LLI Pagnoni S.p.A., Italy

[21] Appl. No.: 341,165

[22] Filed: Jan. 21, 1982

[30] Foreign Application Priority Data

May 22, 1981 [IT] Italy .............................. 21861/81[U]

[51] Int. Cl.³ ............................ B29J 5/08; B30B 1/08; B30B 7/02

[52] U.S. Cl. .................................... 425/338; 425/406; 425/451.6

[58] Field of Search ............ 425/338, 339, 406, 450.1, 425/451.5, 451.6, 589, 592, 593, DIG. 220, DIG. 222

[56] References Cited

U.S. PATENT DOCUMENTS

| | | | |
|---|---|---|---|
| 2,172,003 | 9/1939 | Stanley et al. | 425/338 X |
| 2,521,282 | 9/1950 | Butler | 425/338 X |
| 2,602,961 | 7/1952 | Spiers | 425/339 X |
| 2,966,183 | 12/1960 | Werner | 425/338 |
| 3,103,701 | 9/1963 | Calchera et al. | 425/DIG. 222 |
| 3,237,246 | 3/1966 | Carlsson | 425/338 |
| 3,518,724 | 7/1970 | Book | 425/338 |
| 3,667,890 | 6/1972 | Rusmini | 425/406 |
| 3,816,052 | 6/1974 | Schoppee et al. | 425/406 |
| 3,840,314 | 10/1974 | Book | 425/338 |
| 4,147,492 | 4/1979 | Thiel et al. | 425/450.1 X |

*Primary Examiner*—J. Howard Flint, Jr.
*Attorney, Agent, or Firm*—McGlew and Tuttle

[57] ABSTRACT

An apparatus for a double opening press useful in manufacturing particle board comprises an upper and intermediate movable plate and a lower fixed plate and a chain of levers connected between the upper and intermediate plate. Upper and lower spaces are defined between the intermediate plate and the upper and lower plates respectively. A driving unit is connected to the upper plate which lowers the upper plate and which, simultaneously, through the action of the chain of levers, also lowers the lower plate at a rate which is chosen so as to close the upper and lower openings at the same speed.

16 Claims, 5 Drawing Figures

APPARATUS FOR THE SIMULTANEOUS CLOSING OF THE TWO OPENINGS OF A PRESS FOR MANUFACTURING WOOD CHIPBOARD OR FIBREBOARD OR THEIR SUBSTITUTES

FIELD AND BACKGROUND OF THE INVENTION

The present invention relates in general to presses, and, in particular, to a new and useful apparatus for simultaneously closing two openings in a double opening press.

Multi-opening presses, including double opening presses, for manufacturing wood chipboard, fibreboard or their substitutes (collectively termed "particle board") comprise, among their auxiliary members, apparatus for the simultaneous closing, from top to bottom, of the press openings. Such apparatus of hitherto known types, have various drawbacks, such as complexity and/or excessive overall width, which inevitably lead to a certain lack of flexibility in their operation.

SUMMARY OF THE INVENTION

The apparatus in accordance with the present application has been devised in order to remedy such drawbacks.

In particular, the invention comprises various leverage systems each one made of five levers, disposed on each side in the upper part of the press and spaced apart according to the length of the press, and therefore best suited to cause the simultaneous closing of the press openings, from a top position toward a bottom position.

Secondly the invention is characterized in that the various lever systems are all integral and rotatable together on a horizontal shaft, provided at each side of the press, having length equal to that of the press.

Thirdly the apparatus in accordance with the invention is novel in that it also comprises, by way of completement for each lever system, a tie-rod connected at one end to the intermediate plate and at the other to the terminal lever.

Fourthly the apparatus herein described is novel in that all its components are grouped together so as not to protrude laterally from the press structure.

Fifthly the apparatus is novel in that the two horizontal shafts provided in said apparatus connecting the various lever systems also act at the same time as "torsion bars", thereby guaranteeing constant parallelism between the various lever systems and therefore the exact horizontal position of the two plates connected to them during the stroke of said plates.

These main features and other lesser important ones will be more readily apparent from the following description with reference to the accompanying drawings.

BRIEF DESCRIPTION OF THE DRAWINGS

In the drawings, the figures are each front elevational views, partially in section of a double opening press fitted with the apparatus in accordance with the invention during the various processing or maintenance phases, namely.

DESCRIPTION OF THE PREFERRED EMBODIMENT

Figure 1:
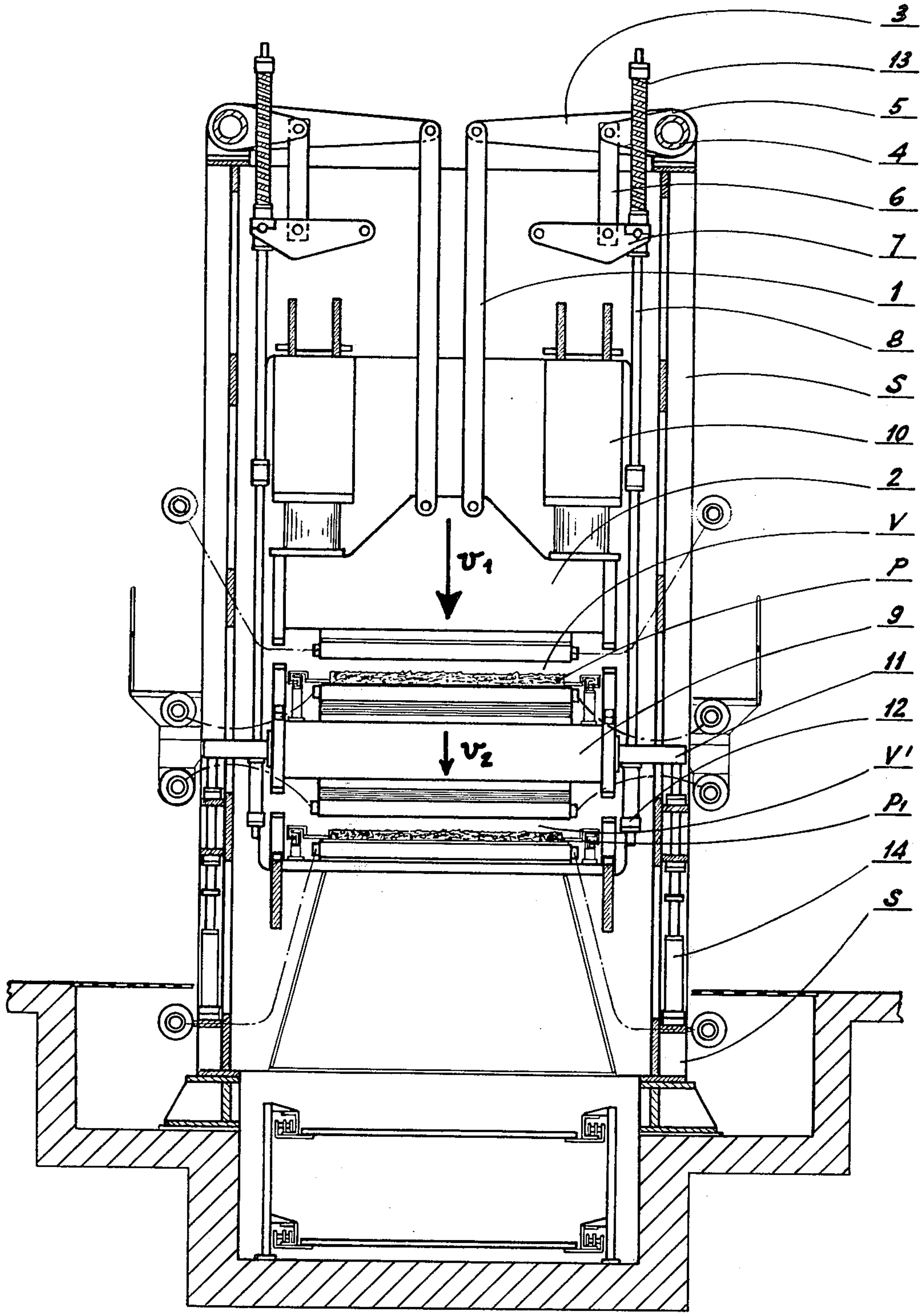
FIG. 1 shows the press semi-open during the press closing phase.
Figure 2:
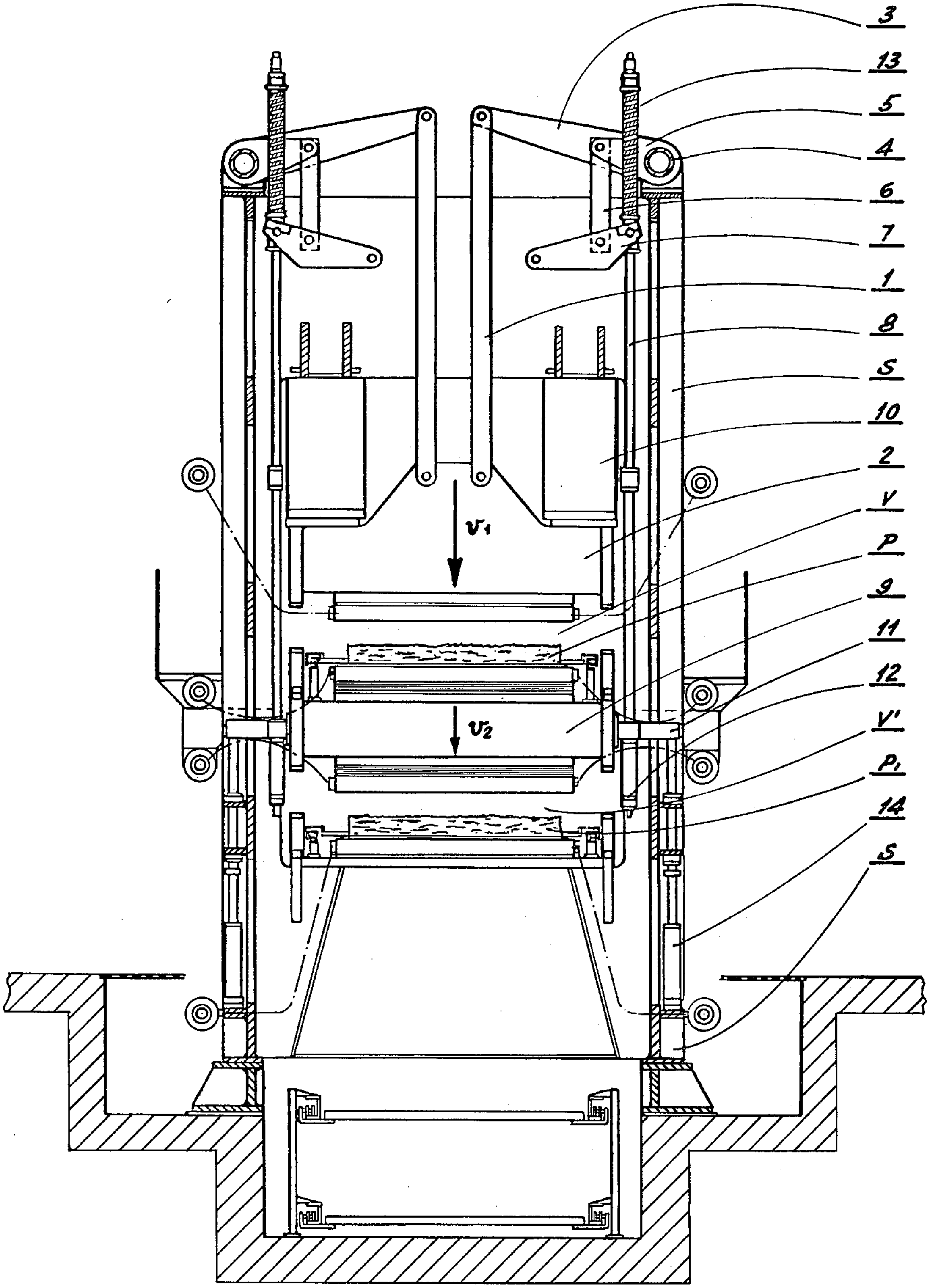
FIG. 2 shows the press open during the loading of the boards.
Figure 3:
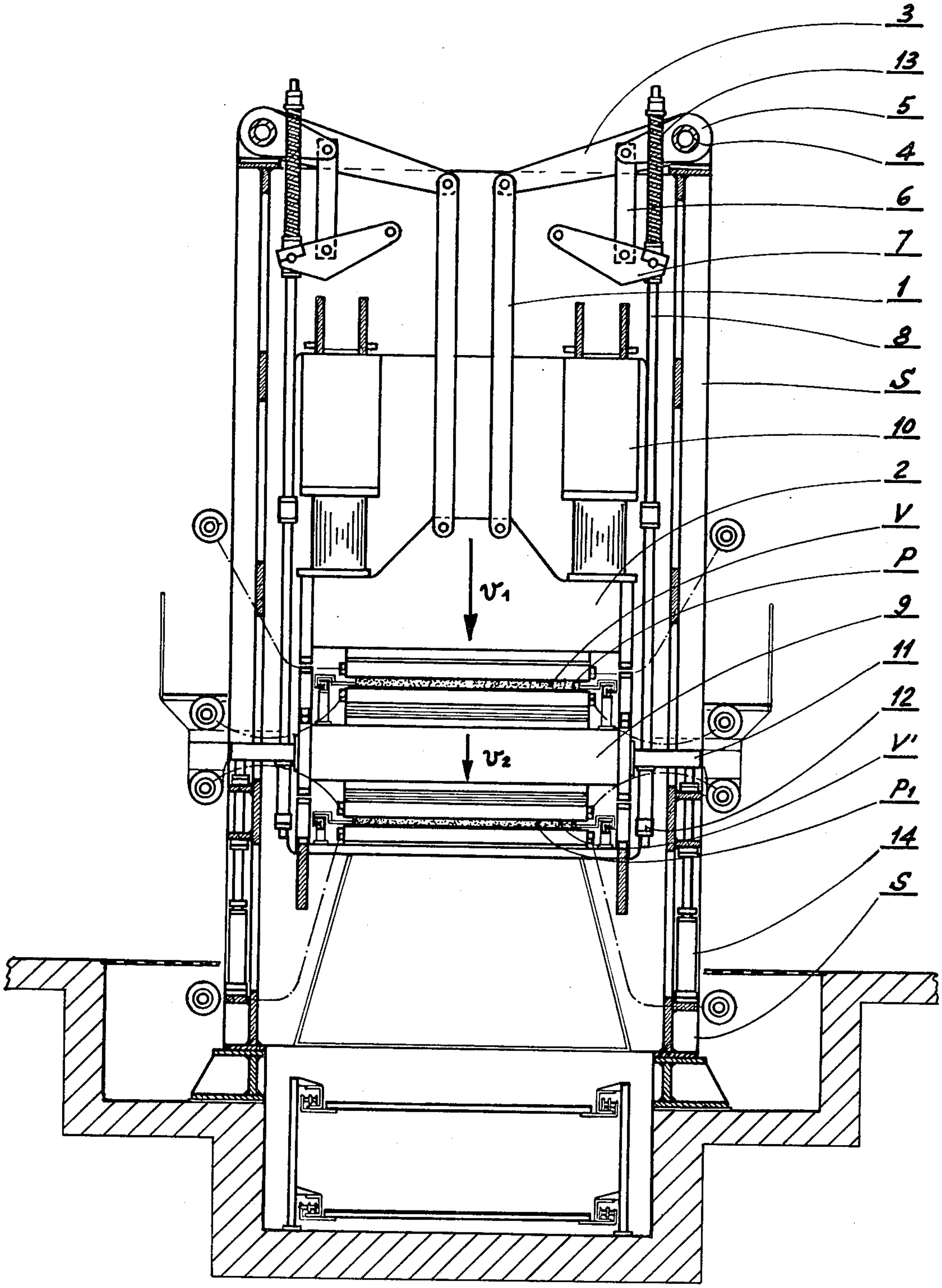
FIG. 3 shows the press closed during curing of the boards.

As can be seen in the drawings, the apparatus in accordance with the invention comprises various groups of constituent elements. At each side of the press are provided a first vertical lever 1 hinged on an upper movable plate 2; a second lever 3 hinged on the other end of lever 1 and connected integrally to horizontal shaft 4; a third lever 5 connected integrally with shaft 4 and hinged to a fourth vertical lever 6; and lastly a fifth lever 7 hinged at one end to the press structure or frame S and at the other end to rod 8 for supporting intermediate plate 9. A lever system is thus provided on each side of the press which is made up of a plurality of levers in a lever chain between the upper and intermediate plates.

In greater detail, the vertical lever 6, previously indicated as the fourth lever of the system, is hinged at one end in a suitably located intermediate position to the ends of the fifth lever 7. Consequently for each movement of plate 2, controlled by cylinder-piston drive units 10—which are in turn suitably hydraulically actuated—there will be a rotation of shaft 4 through levers 1 and 3 and hence a rotation by the same angle of lever 5. Therefore through lever 6 there will be a rotation of lever 7 by an angle sufficient to cause vertical movement of rod 8 which is calculated to be half the original displacement of plate 2.

The intermediate plate 9, which is laterally supported by rods 8 through brackets 11 and nuts 12, can therefore perform displacements of equal duration in both directions, said displacements being equal to half the displacements of upper plate 2 with speeds $v_2$ therefore being half to speeds $v_1$ of the upper plate toward the lower plate.

As a result, it is possible to keep the amplitudes (size) of openings V, V′ equal during the press opening and closing phases.

The apparatus in accordance with the invention is complete with springs 13, which are already well known, and are suitably fastened to the upper ends of rods 8 by any suitable means so as to accommodate small differences in amplitude of the two openings V and V′ which are unavoidable when small differences in thickness exists between boards P and P′.

Figure 4:
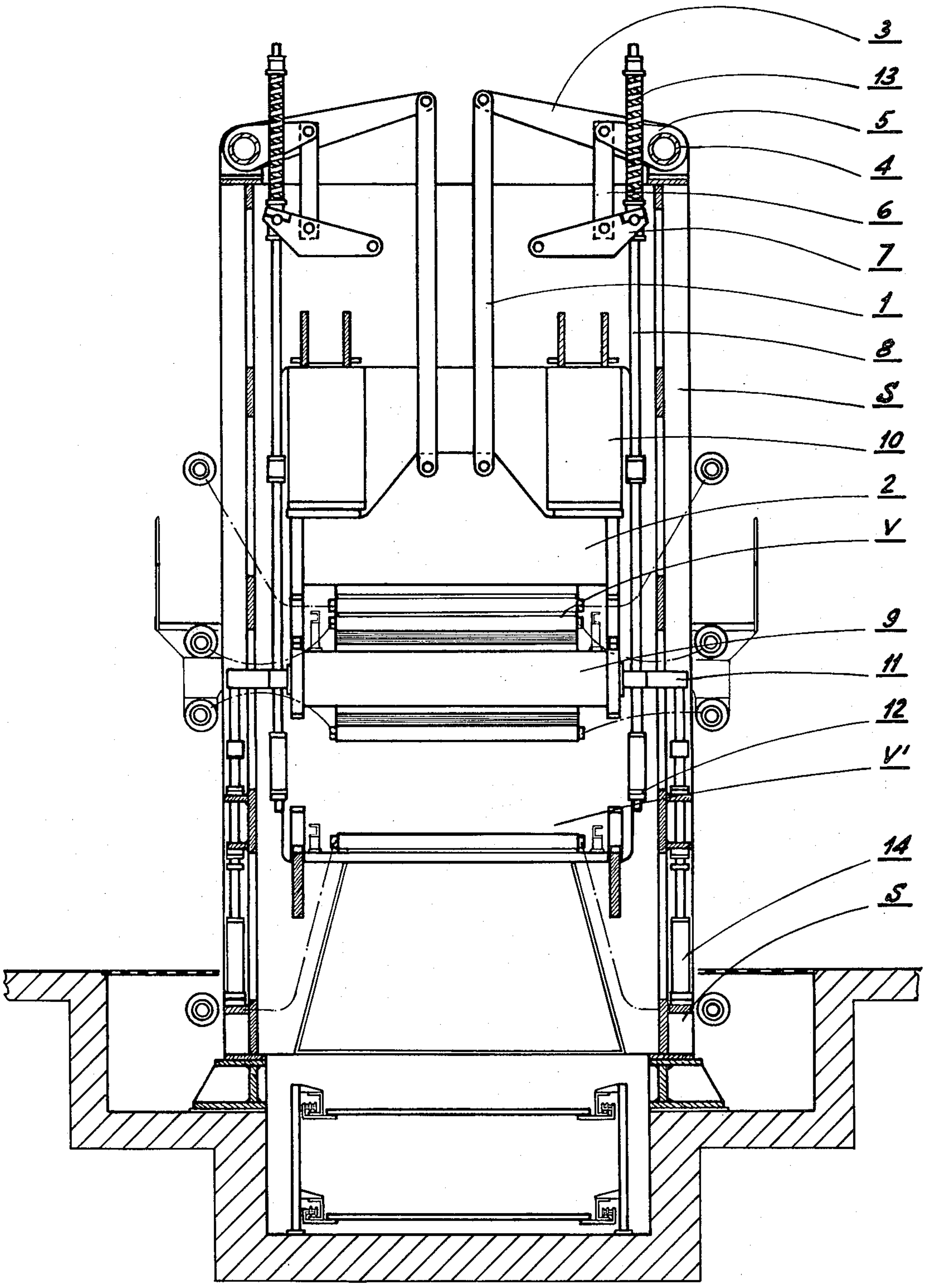
FIG. 4 shows the press in an inoperative position for maintenance of the lower opening.

Lastly, the apparatus in question is also provided with second cylinder-piston drive units 14, connected at one end to structure S and at the other to brackets 11. These units are hydraulically actuated through suitable means and their function is above all to aid rods 8 in supporting intermediate plate 9 which is particularly heavy. They also serve, with the press in an unoperated state and for the purposes of maintenance, to raise intermediate plate 9 until it comes into contact with upper plate 2 (see FIG. 4).

This permits easy access to lower opening V′.

Figure 5:
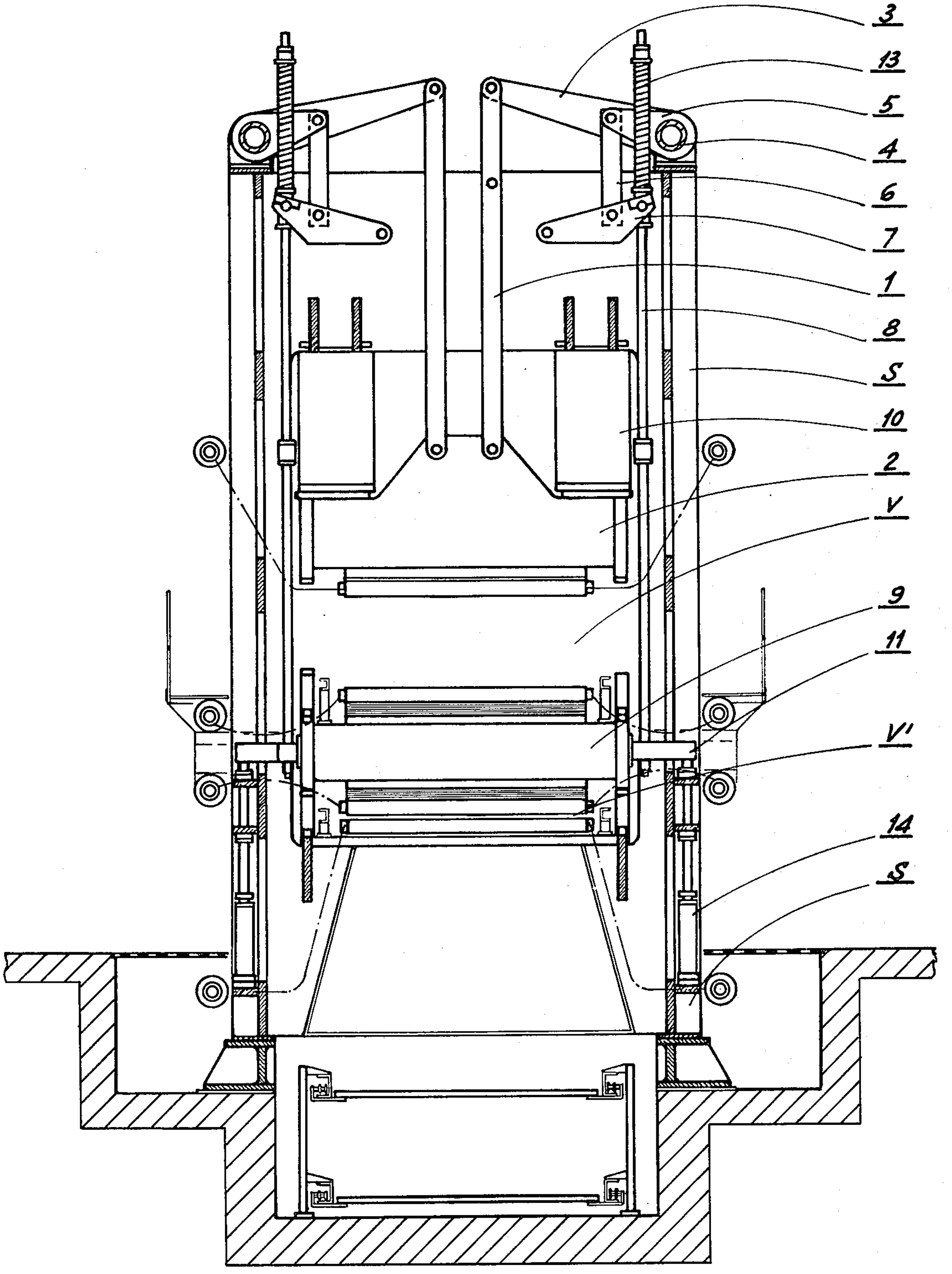
FIG. 5 shows the press for maintenance of the upper opening.

Likewise there is also provision for an easy access to the upper opening V with the press in an unoperated state and for maintenance purposes, by removing off nuts 12 and then lowering intermediate plate 9 until it closes lower opening V′ (FIG. 5).

The above depicted simultaneous closing is usually applied on double opening presses complete with metallic gibs of same thickness as the boards to be produced, which act like limit stops. This system can be replaced by an electronic stroke detection which is so calibrated that, when the required board thickness is reacted, the press automatically stops closing.

With this equipement in a double opening press, the exact control of the final sum of both P and P1 thicknesses is obtained, but not necessarily of both the thicknesses of boards, which could differ from the nominal thickness; one failing below and the other exceeding the value.

In that case the present simultaneous closing allows, through the cylinder-piston systems 14, the elimination of the difference between both thicknesses, providing slight movements of the intermediate plate 9 in the completely closed press, so that the board with excess thickness may be reduced and that with reduced thickness at the same time, may be increased.

While specific embodiments of the invention have been shown and described in detail to illustrate the application of the principles of the invention, it will be understood that the invention may be embodied otherwise without departing from such principles.

We claim:

1. An apparatus for simultaneously closing two openings of a press for manufacturing particle board, the press having a frame, a lower plate connected to the frame, an upper plate movably mounted to the frame and an intermediate plate between the upper and lower plate and defining an upper opening with the upper plate and a lower opening with the lower plate, comprising:

drive means connected to the upper plate for moving the upper plate downwardly to close the upper opening; and a lever system disposed on each side of the frame, each lever system comprising a plurality of levers in a lever chain connected between the upper and intermediate plate with at least one lever connected to the frame, each lever system operable together to move the intermediate plate downwardly to close the lower opening with movement of the upper plate downwardly to close the upper opening;

each lever system substantially disposed in an upper part of the press.

2. An apparatus according to claim 1, wherein each lever system comprises five levers in the lever chain.

3. An apparatus according to claim 1, wherein each lever system includes a substantially horizontally extending shaft rotatably mounted to the frame and fixedly connected to at least two of said levers in each lever chain.

4. An apparatus according to claim 3, wherein said shaft of each lever system extends substantially the length of the press.

5. An apparatus according to claim 3, wherein said shaft of each lever system is constructed to act as a torsion bar in said lever chain so as to maintain parallel movement of each lever system and thus maintain horizontal positioning of the upper and intermediate plates during movement of the upper and intermediate plates.

6. An apparatus according to claim 3, wherein said lever chain of each lever system comprises a first substantially vertically extending lever connected at a lower end thereof to the upper plate, a second lever connected between an upper end of said first lever and said shaft, a third lever connected to said shaft, said second and third levers fixedly connected to said shaft, a fourth lever connected to an end of said third lever remote from said shaft, a fifth lever connected at one end thereof to the frame and connected at an intermediate location thereof to an end of said fourth lever opposite from said third lever, a tie rod connected to an end of said fifth lever remote from the end of said fifth lever connected to the frame, said tie rod connected to one side of the intermediate plate.

7. An apparatus according to claim 6, wherein said second lever is longer than said third lever, said second lever having an end spaced inwardly toward a center of the press which is connected to an upper end of said first lever and said third lever having an end spaced inwardly toward a center of the press connected to an upper end of said fourth lever.

8. An apparatus according to claim 7, wherein said fifth lever has an end connected to the frame which is positioned inwardly toward a center of the press with respect to the ends of said fifth lever connected to said tie rod.

9. An apparatus according to claim 1, wherein each lever system includes a tie-rod connected at one end thereof to one of said levers in said lever chain, and at an other end thereof to one side of the intermediate plate.

10. An apparatus according to claim 9, wherein said lever chain of each lever system includes five levers connected sequentially from the upper plate to the intermediate plate, said tie rod connected to the one of said levers which is most remote from the upper plate in said lever chain.

11. An apparatus according to claim 9, including a connecting nut connecting each tie rod to the intermediate plate, said tie rod and nut arranged to permit unscrewing of each nut to lower the intermediate plate and close the lower opening and open the upper opening.

12. An apparatus according to claim 1, wherein each of said lever system is disposed and constructed so as to be no wider than the frame so that no portion of each lever system protrudes laterally beyond the press.

13. An apparatus according to claim 1, including second drive means connected between the frame and the intermediate plate for driving the intermediate plate upwardly to move the intermediate plate against the upper plate so as to close the upper opening and open the upper opening.

14. An apparatus according to claim 13, wherein said second drive means comprises a piston-cylinder combination connected between the frame and the intermediate plate on either side of the frame and intermediate plate.

15. An apparatus according to claim 13, wherein said second drive means is operable during operation of said first mentioned drive means to adjust the relative size of the upper and lower openings while the upper and lower openings are being closed by movement downwardly of the upper and intermediate plates.

16. An apparatus according to claim 15, including electronic limit means connected to the frame for actuating said second drive means to adjust the size of the upper and lower openings when the upper plate is in its substantially lower-most position.

* * * * *